Patented Sept. 12, 1939

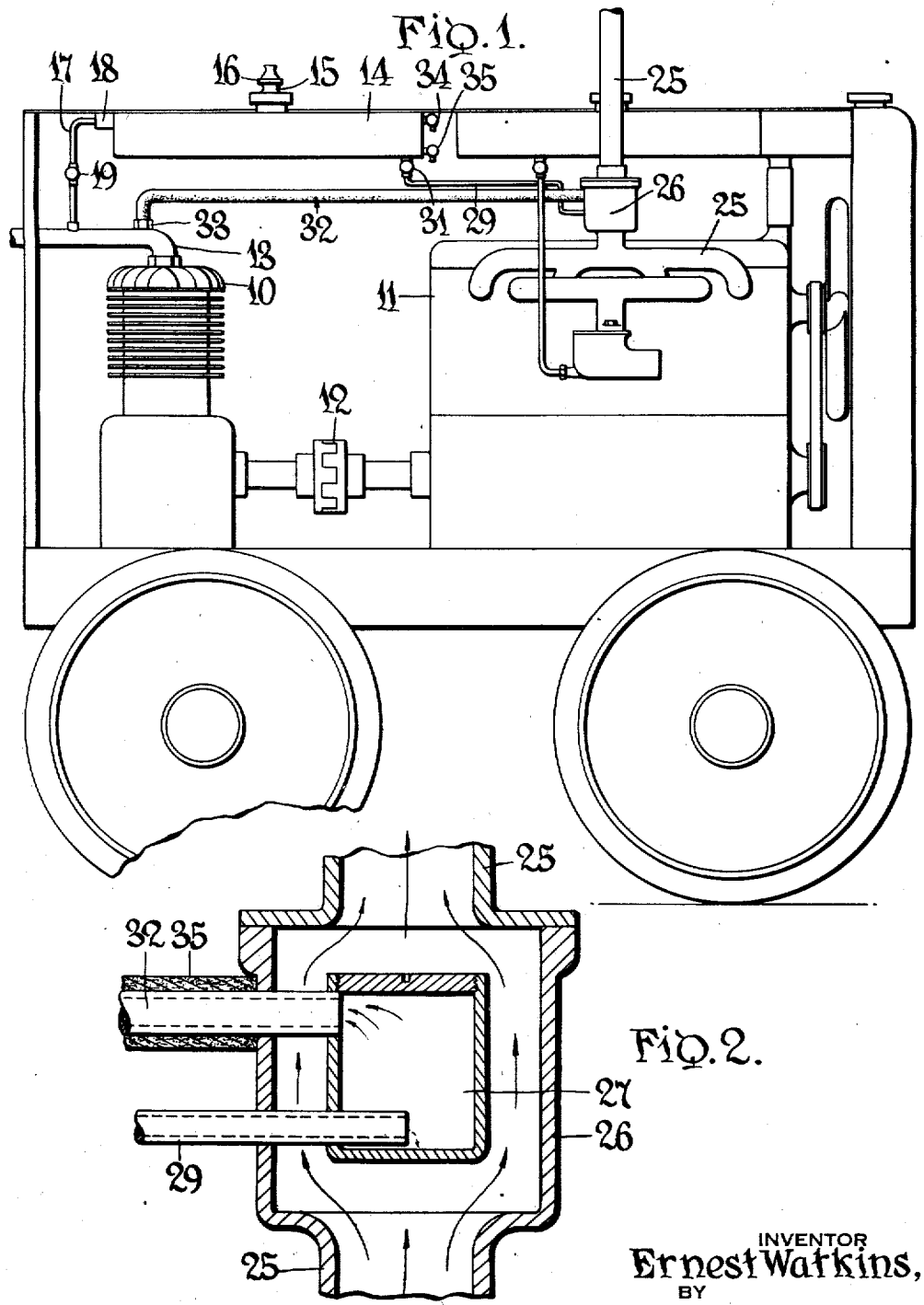

2,172,882

UNITED STATES PATENT OFFICE 2,172,882

ANTIFREEZE SYSTEM

Ernest Watkins, St. Cloud, Minn.

Application March 29, 1938, Serial No. 198,747

8 Claims. (Cl. 230—56)

This invention relates to a method and apparatus for preventing freezing in pipe lines.

In the operation of portable compressors considerable difficulty has been encountered at low temperatures due to the deposition on the inner walls of the compressed air lines of moisture which collects and freezes, often to a degree which results in completely stopping up the line. It is an object of my present invention to provide means and a mode of operation whereby this difficulty will be corrected.

Some attempts have hitherto been made in the direction of retarding or preventing the freezing of moisture in pipe lines but these attempts have been limited to the provision of stationary apparatus in association with more or less permanent pipe lines. By the means and method of my present invention instrumentalities are provided for preventing freezing in portable pneumatic equipment and like apparatus and in my preferred form I show an air compressor mounted upon a motor truck or other vehicle and driven by an internal combustion engine. The driving engine for the compressor may, of course, be the power plant for propelling the vehicle or it may be separate and distinct therefrom.

One instance wherein the application of the principles of my invention will involve an engine which is at once the propelling engine for the vehicle and the engine for driving the compressor is found where compressed air is generated in association with the vehicle power plant for use in operating accessory systems such as air brakes on trucks and buses, pneumatic dumping hoists, etc.

In the drawing, Fig. 1 is a general side elevational view showing apparatus embodying one form of apparatus wherein the principles of my invention may have application.

Fig. 2 is an enlarged fragmentary cross sectional view of the vaporizing chamber of the illustrated embodiment.

In the drawing the numeral 10 designates an air compressor of conventional design having associated therewith a driving engine 11 which, in the illustrated embodiment, is of the internal combustion type and which may have driving connection with the compressor through a flexible coupling 12 or in any other convenient manner.

A conduit 13, for the compressed air, leads away from the compressor to the point where the air is to be used, usually by way of a receiver or reservoir (not shown) where the air under pressure is stored until its use is desired.

According to my invention and in one form thereof I provide a tank 14 which is adapted to contain a supply of a preferably volatile liquid anti-freeze. The supply of anti-freeze in the tank 14 may be replenished by means of a filler pipe 15 which includes a manually operable closure valve 16.

One way communication is established between the compressed air conduit 13 and the anti-freeze tank 14 by means of a conduit 17 and a check valve 18. The check valve is arranged to be opened, against the resistance of gravity or otherwise by pressure of the compressed air, so as to permit flow of compressed air into the tank 14 to raise the pressure therein to substantially the pressure in the conduit 13. The check valve 18 is arranged to prevent the possibility of retrograde flow from the tank 14 toward the conduit 13 by way of the conduit 17 in the event the pressure in the former exceeds the pressure in the latter. A manual closure valve 19 is provided in the conduit 17 so that the tank can be closed off from the conduit 13 when it is desired to open the valve 16 in the pipe 15 to replenish the supply of liquid in the tank 14.

The driving engine 11 has a conventional exhaust conduit or manifold 25 and, for the purpose of utilizing the heat of the products of combustion of the engine, I may interpose therein a casing portion 26 which acts as an enlarged continuation of the conduit or manifold 25.

As is best shown in Fig. 2, the casing 26 has disposed therein a vaporizing chamber 27 which is spaced from the inner walls of the casing 26 at all points to provide an annular passage thereabout for the products of combustion flowing in the manifold 25. A conduit 29 extends between the tank 14 and the vaporizing chamber 27 and enters the latter adjacent its lower portion. The conduit 29 is provided with a needle valve 31 which is manually operable to accurately control flow of the liquid anti-freeze from the tank 14 to the interior of the chamber 27.

I have illustrated my apparatus as contemplating a supply tank disposed at a higher elevation than the vaporizing chamber so that flow of liquid to the vaporizing chamber through the conduit 29 will be effectively insured by reason of gravity alone, but it is obvious that if it be desired to locate the tank 14 at a lower elevation, suitable means may be provided for causing liquid flow from the tank 14 to the vaporizing chamber 27 in the casing 26.

Leading from the top of the vaporizing chamber 27 there is a second conduit 32 which leads to and enters the compressed air line as at 33 and the vaporized anti-freeze which normally collects in the top of the vaporizing chamber 27 is carried off through the conduit 32 and delivered into the air line 13. It then admixes with the compressed air in the line and particularly with any moisture which may be present in the air. It will be seen that, as a result of such admixture, the compressed air loses the heat gained in compression, thereby precipitating a portion of its water content, there will be no danger of the water freezing even though the outside temperature is well below the freezing point of water.

I preferably insulate the conduit 32 as indicated at 35 so that as much anti-freeze as possible is retained in vapor form in its passage from the vaporizing chamber to the compressed air system. The vaporizing chamber 27 may be supported within the casing portion 26 merely by the conduits 29 and 32 or in any other convenient manner and in an alternative form the vaporizing chamber may be so constructed as to surround the exhaust manifold rather than be disposed within it.

When the apparatus is in condition for the commencement of operation the filler valve 16 is closed and the pressure valve 19 is open. The check valve 18, permitting flow in the conduit 17 only from the air line 13 to the tank 14, insures that the pressure in the tank 14 will be at least equal to the pressure prevailing in the air line 13 and the open conduit 32 extending between the air line 13 and the vaporizing chamber 27 insures that the pressure in the vaporizing chamber will also be substantially equal to the pressure prevailing in the air line 13.

If, then, the manually controlled needle valve 31 be opened, liquid anti-freeze will flow by gravity through the conduit 29 and into the vaporizing chamber 27. The degree to which the needle valve 31 is opened controls the rate of flow from the tank 14 to the vaporizing chamber 27 and this degree of opening will, of course, be adjusted by the operator so as to properly proportion the production of anti-freeze vapor to the prevailing temperature and probable moisture content of the air.

Upper and lower petcocks 34 and 35, respectively, may be provided for checking the level of liquid in the tank 14 and the lower petcock 35 may be used if it is desired to drain the tank 14.

While I have discussed my invention in connection with a mechanical air compressor driven by an internal combustion engine, it will be seen that the principles of my invention may be employed whenever the driving means for the compressor is a heat engine of any form, for instance, a steam engine.

While a single embodiment of the principles of my invention has been shown in the drawings and described in detail, it is not intended that the invention is to be limited thereby or in any other way excepting as defined in the appended claims.

I claim:

1. In combination with an air compressor having an air line leading therefrom and an internal combustion engine having an exhaust manifold, apparatus for retaining the freezing of moisture in the compressed air delivered from said compressor, said apparatus comprising a reservoir for containing a volatile liquid anti-freeze, a vaporizing chamber adapted to utilize the heat from the exhaust manifold of said engine, means for conducting liquid anti-freeze from said reservoir to said vaporizing chamber, and means for delivering vaporized anti-freeze from said chamber to said air line for preventing freezing of moisture or deposition of frost therein.

2. In combination with an air compressor having an air line leading therefrom and an internal combustion engine, apparatus for retarding the freezing of moisture in the compressed air delivered from said compressor, said apparatus comprising a reservoir for containing a volatile liquid anti-freeze, a vaporizing chamber adapted to utilize the heat of combustion of said engine, means for conducting liquid anti-freeze from said reservoir to said vaporizing chamber and means for delivering vaporized anti-freeze from said chamber to said air line for preventing freezing of moisture or deposition of frost therein.

3. In combination with an internal combustion engine and an air pressure system associated therewith, apparatus for retarding the freezing of moisture in said system comprising a reservoir for containing a supply of volatile liquid anti-freeze, means utilizing the heat of combustion of said engine for vaporizing said anti-freeze and communicating with said reservoir, and means for delivering vaporized anti-freeze to said air pressure system for preventing freezing of moisture or deposition of frost therein.

4. In combination with an internal combustion engine and an air pressure system associated therewith, apparatus for retarding the freezing of moisture in said system comprising a reservoir for containing a supply of volatile liquid anti-freeze, means utilizing the heat of combustion of said engine for vaporizing said anti-freeze, means for delivering vaporized anti-freeze to said air pressure system for preventing freezing of moisture or deposition of frost therein, and a conduit extending between said air pressure system and said reservoir for maintaining the pressure in said apparatus substantially equal to the pressure in said system.

5. In combination with an internal combustion engine having an exhaust manifold and an air pressure system associated therewith, apparatus for retarding the freezing of moisture in said system comprising a reservoir for containing a supply of volatile liquid anti-freeze, vaporizing means associated with said exhaust manifold and utilizing the heat of combustion of said engine for vaporizing said anti-freeze, and means for delivering vaporized anti-freeze from said chamber to said air pressure system for preventing freezing of moisture or deposition of frost therein.

6. In combination with an internal combustion engine having an exhaust manifold and an air pressure system associated therewith, apparatus for retarding the freezing of moisture in said system comprising a reservoir for containing a supply of volatile liquid anti-freeze, vaporizing means associated with said exhaust manifold and utilizing the heat of combustion of said engine for vaporizing said anti-freeze, means for delivering vaporized anti-freeze from said chamber to said air pressure system for preventing freezing of moisture or deposition of frost therein, and a conduit extending between said air pressure system and said reservoir for maintaining the pressure in said apparatus substantially equal to the pressure in said system.

7. In combination with an air compressor having an air line leading therefrom and a propelling engine of the heat engine type, apparatus for retarding the freezing of moisture in the compressed air delivered from said compressor, said apparatus comprising means for containing a supply of a volatile liquid antifreeze, a vaporizing chamber associated with said heat engine and adapted to utilize a portion of the heat thereof for vaporizing said liquid antifreeze, and fluid conduit means extending between said supply means and said chamber and between said chamber and said air line whereby liquid is delivered from the supply means to said vaporizing chamber and anti-freeze vapor is delivered from said chamber to the air line.

8. In combination with a heat engine and an air pressure system associated therewith, apparatus for retarding the freezing of moisture in said system comprising a reservoir for containing a supply of volatile liquid anti-freeze, means utilizing a portion of the heat of said engine for vaporizing said anti-freeze and communicating with said reservoir, and means for delivering vaporized anti-freeze to said air pressure system for preventing freezing of moisture or deposition of frost therein.

ERNEST WATKINS.

CERTIFICATE OF CORRECTION.

Patent No. 2,172,882.                                September 12, 1939.

ERNEST WATKINS.

It is hereby certified that error appears in the printed specification of the above numbered patent requiring correction as follows: Page 2, first column, line 70, claim 1, for the word "retaining" read retarding; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.

ratus for retarding the freezing of moisture in the compressed air delivered from said compressor, said apparatus comprising means for containing a supply of a volatile liquid anti-freeze, a vaporizing chamber associated with said heat engine and adapted to utilize a portion of the heat thereof for vaporizing said liquid anti-freeze, and fluid conduit means extending between said supply means and said chamber and between said chamber and said air line whereby liquid is delivered from the supply means to said vaporizing chamber and anti-freeze vapor is delivered from said chamber to the air line.

8. In combination with a heat engine and an air pressure system associated therewith, apparatus for retarding the freezing of moisture in said system comprising a reservoir for containing a supply of volatile liquid anti-freeze, means utilizing a portion of the heat of said engine for vaporizing said anti-freeze and communicating with said reservoir, and means for delivering vaporized anti-freeze to said air pressure system for preventing freezing of moisture or deposition of frost therein.

ERNEST WATKINS.

CERTIFICATE OF CORRECTION.

Patent No. 2,172,882.　　　　　　　　　　　September 12, 1939.

ERNEST WATKINS.

It is hereby certified that error appears in the printed specification of the above numbered patent requiring correction as follows: Page 2, first column, line 70, claim 1, for the word "retaining" read retarding; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.